Figure 1:
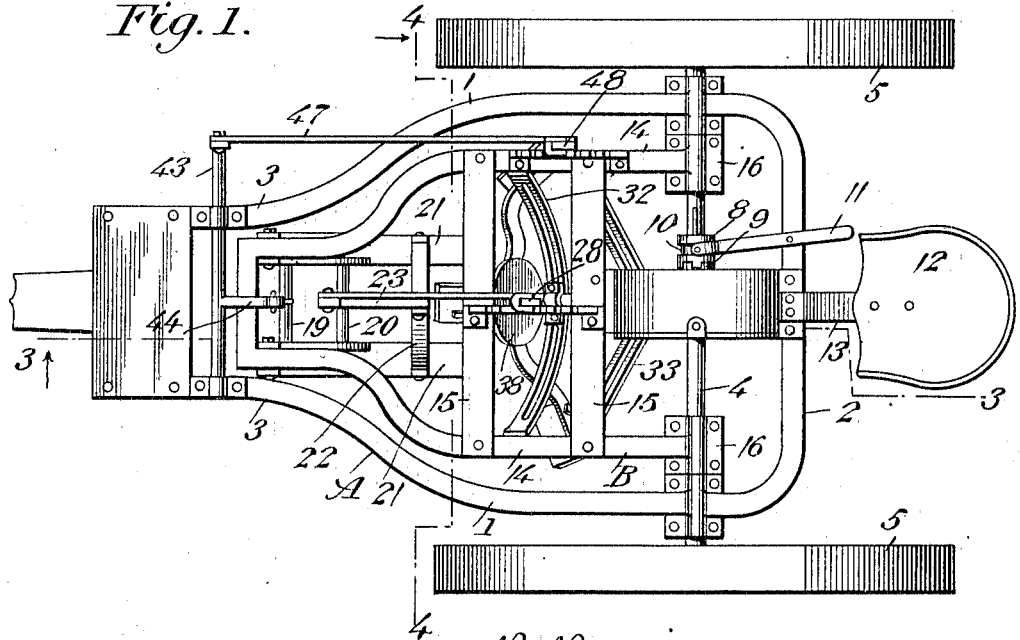

J. W. EARNEST.
COTTON CHOPPER.
APPLICATION FILED SEPT. 9, 1911.

1,059,288.

Patented Apr. 15, 1913.

3 SHEETS—SHEET 1.

Witnesses
F. H. Ackman Jr.
Wm. Bagger

Inventor
James W. Earnest

By Victor J. Evans
Attorney

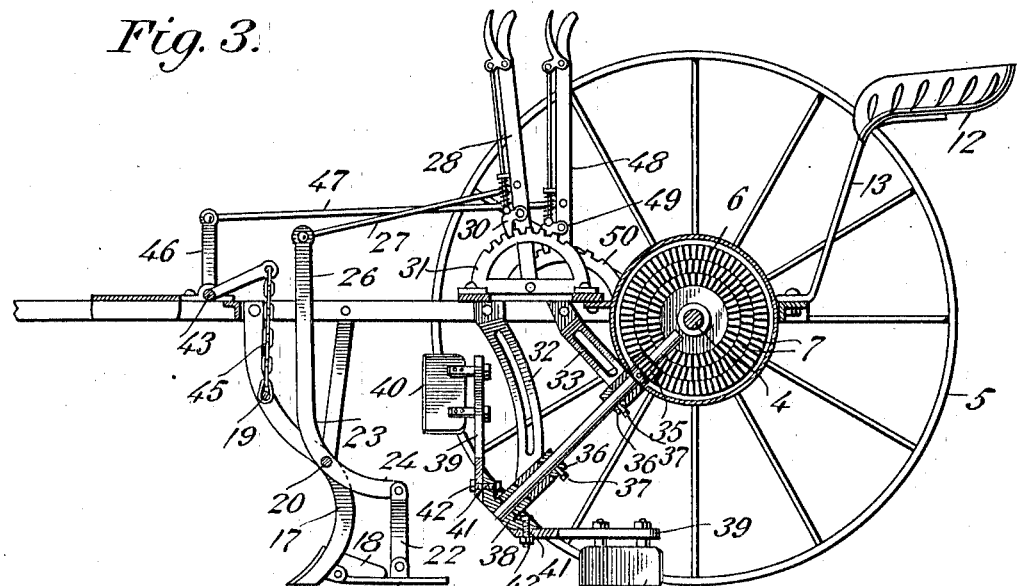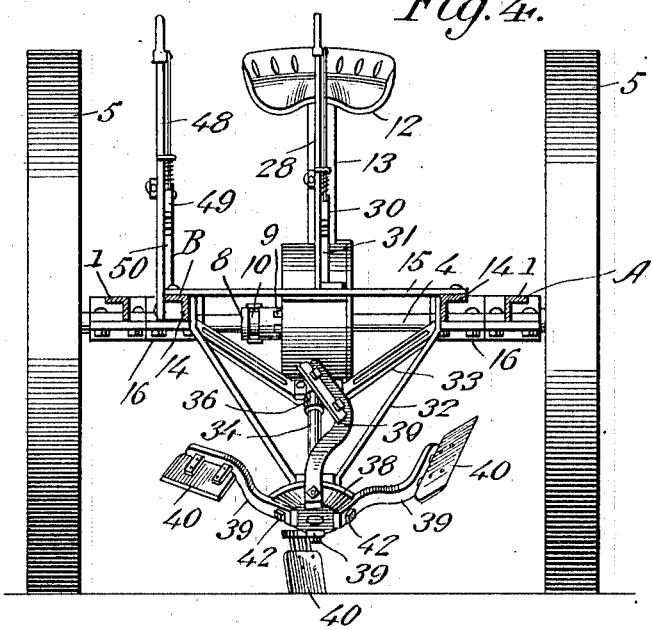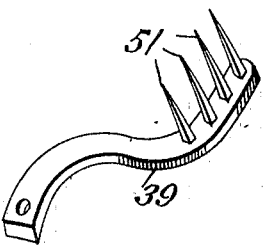

J. W. EARNEST.
COTTON CHOPPER.
APPLICATION FILED SEPT. 9, 1911.

1,059,288.

Patented Apr. 15, 1913.

3 SHEETS—SHEET 3.

Inventor
James W. Earnest

By Victor J. Evans
Attorney

Witnesses

UNITED STATES PATENT OFFICE.

JAMES W. EARNEST, OF CRANDALL, GEORGIA.

COTTON-CHOPPER.

1,059,288.   Specification of Letters Patent.   Patented Apr. 15, 1913.

Application filed September 9, 1911. Serial No. 648,529.

*To all whom it may concern:*

Be it known that I, JAMES W. EARNEST, a citizen of the United States, residing at Crandall, in the county of Murray and State of Georgia, have invented new and useful Improvements in Cotton-Choppers, of which the following is a specification.

This invention relates to cotton choppers, and it has particular reference to that class of cotton choppers which are provided with a shaft supported for rotation and having a hub provided with radiating arms carrying chopping blades which by the rotation of the shaft are brought into engagement with the row of growing plants which are thereby chopped out, stands being left at suitable intervals.

The principal object of the present invention is to so arrange and support the chopping members that they will engage the row of plants at an angle as the machine advances, closely resembling the stroke of a hoe manipulated by hand, and thus effectively chopping out the superfluous plants without injuring or covering the plants that are left standing.

A further object of the invention is to produce a cotton chopper equipped with scraping plows or members, the same being provided with earth engaging wings, and manipulating means being provided whereby the wings may be pressed in the direction of the ground with varying pressure, thereby thoroughly and efficiently regulating the depth to which the scraping plows shall be permitted to work and avoiding injury to the growing plants by scraping or barring off the same too deeply.

A still further object of the invention is to produce a simple and improved frame structure whereby the operative parts of the device may be adjusted vertically and thrown to a non-operative position when required in order to avoid obstructions in the field or for the purpose of transporting the machine from place to place.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 2:
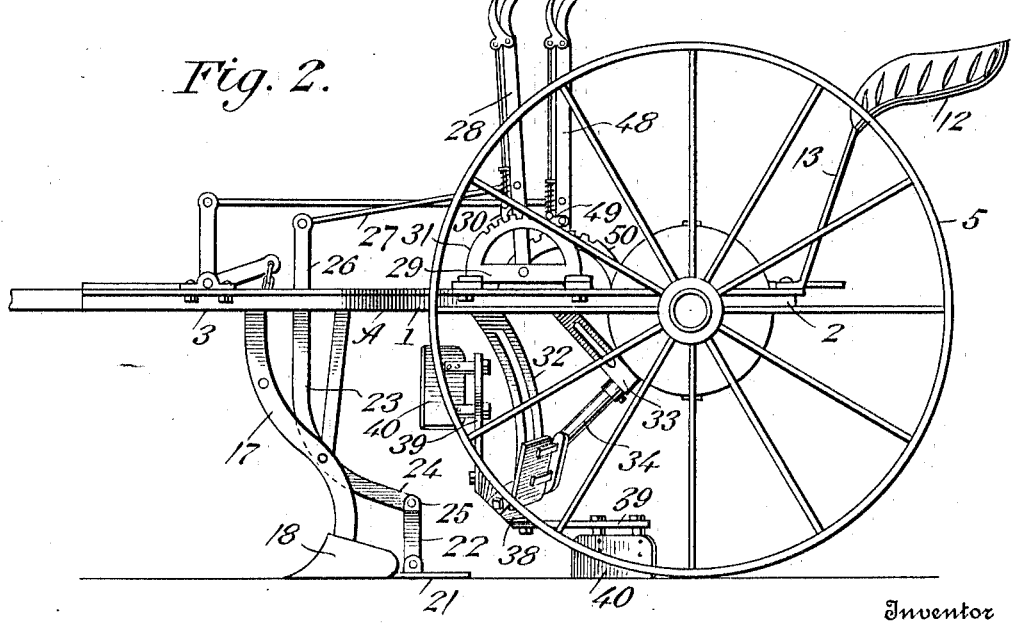
Figure 5:
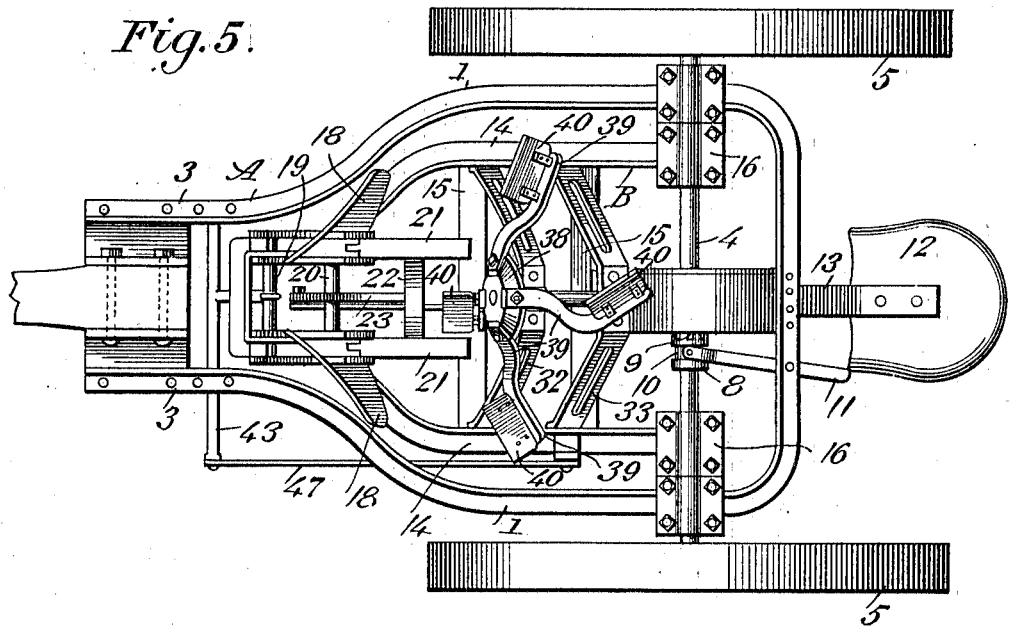
Figure 6:
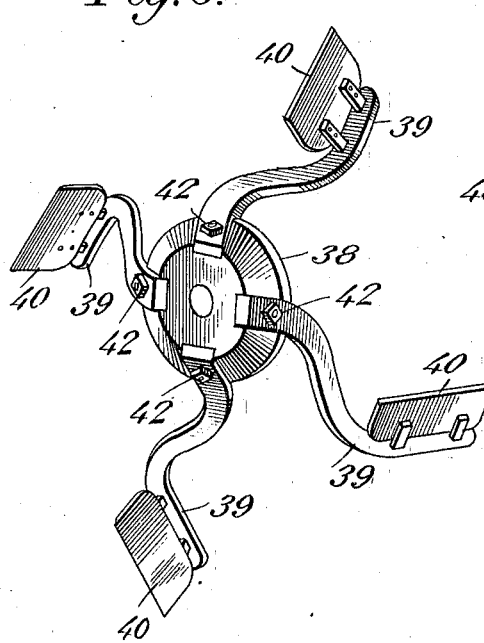
Figure 7:
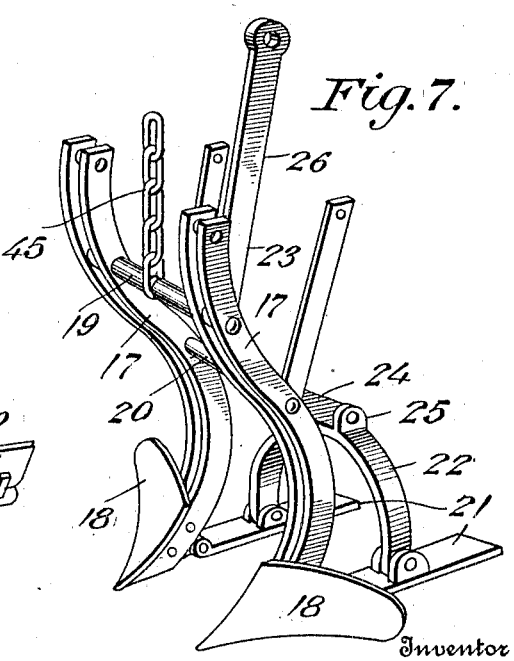

In the drawings,—Figure 1 is a top plan view of a machine constructed in accordance with the invention. Fig. 2 is a side elevation of the same. Fig. 3 is a longitudinal sectional view taken on the line 3—3 in Fig. 1. Fig. 4 is a transverse sectional view taken on the line 4—4 in Fig. 1. Fig. 5 is a bottom plan view. Fig. 6 is a perspective detail view of the chopping wheel detached. Fig. 7 is a perspective detail view of the scraping members and associated parts. Fig. 8 is a perspective detail view illustrating a modification.

Corresponding parts in the several figures are denoted by like characters of reference.

The main frame A of the improved machine may be formed by bending a bar of angle iron or other suitable material to form the side members 1, 1 connected together at their rear ends by a bridge piece 2, said side members being provided intermediate their front and rear ends with offsets 3 converging forwardly, as shown. The side members 1, 1 are provided with boxes or bearings for a revolving axle 4 having transporting wheels 5. Said axle carries a gear disk 6 having a plurality of annular series of teeth 7. The disk 6 which is loosely supported on the axle 4 may be connected with the latter for rotation by means of a clutch member 8 which is feathered upon the shaft and which is adapted to engage a corresponding clutch member 9 formed on the hub of the disk 6. The slidable clutch member or collar 8 is provided with an annular groove 10 engaged by a shipping lever 11 which is adapted to be actuated by the foot of the operator for whom a suitably supported seat 12 is provided, said seat being preferably mounted upon a resilient bar 13 secured upon the bridge member 2 of the frame.

An auxiliary frame B is provided, the same being composed of side members 14 and cross bars 15, said side members having boxes or bearing members 16 engaging the axle 4 with which the auxiliary frame is thus pivotally connected. The side members 14 of the auxiliary frame are preferably shaped to correspond with the contour of the side members of the main frame within which the auxiliary frame is supported, as clearly seen in the drawings. The side members of the auxiliary frame are provided near their front ends with downwardly extending standards 17 carrying the scrapers or barring off plows 18. The standards 17 are connected together near their upper ends by a transverse rod 19 and at a suitable distance below said rod 19 by a transverse rod or brace 20. Pivotally connected with the plows 18 are earth engaging blades or gage members 21 which are connected together by an upwardly extending yoke or arch member 22. Pivotally mounted upon the transverse rod or brace 20 is a lever 23 having a downwardly extending arm 24 which engages a keeper 25 at the upper end of the arch 22. The upwardly extending arm 26 of the lever 23 is connected by a rod 27 with a hand lever 28 which is fulcrumed upon a longitudinal bar 29 connecting the cross bars 15 of the auxiliary frame B, said hand lever being utilized to actuate the lever 23 for the purpose of raising or depressing the gage members 21, as may be required. The hand lever 28 is provided with a stop member 30 engaging a segment rack 31 whereby the parts may be retained in adjusted position.

The auxiliary frame B is provided with suitably arranged bracket members 32, 33 affording bearings for a downwardly and forwardly inclined shaft 34, said shaft being equipped with a pinion 35 adapted to mesh with the teeth 7 of the disk 6. The pinion 35 is longitudinally slidable on the shaft 34 for the purpose of enabling the pinion 35 to be placed in engagement with any one of the concentric series of teeth 7, thereby enabling the speed of the rotation of the shaft 34 to be regulated. The shaft 34 is provided with collars 36 having set screws 37 whereby said collars may be secured upon the shaft for the purpose of retaining the latter in adjusted position in its bearings, the collars 36 being mounted adjacent to the sides of one of the bearing members or brackets 32.

The shaft 34 which is arranged at an angle of approximately 45 degrees to the surface of the ground carries at its lower end a hub 38 having a beveled edge on which are secured a plurality of radially extending arms 39, said arms being curved to present the peculiar S-shape indicated in the drawings, and said arms being also connected with the hub in such a manner as to extend upwardly and rearwardly in the direction of the pinion 35 at the upper end of the shaft. The arms 39 are secured on the beveled edge of the hub 38 by means of bolts 41 and nuts 42. Each arm 39 carries a chopping blade 40, said chopping blades being preferably provided upon the rear faces thereof with bolt members 41' having projecting threaded ends that extend through the arms 39 and are attached to the latter by means of nuts 42'. The chopping blades are mounted and supported in such a manner that when the shaft 34 is rotated, the said blades will successively engage the ground at an angle of approximately 30 degrees to the row of plants that is to be operated upon, cutting diagonally across the row in a manner precisely resembling the stroke of a hoe that is being manipulated by hand. As the machine advances the superfluous plants will thus be trimmed out by the chopping blades and will be deposited at one side of the row, the chopping operation being performed practically without danger of uprooting or otherwise injuring the plants that are to be left standing.

The main frame A is provided adjacent to its front end with bearings for a rock shaft 43 having a radial arm 44 which is connected by a flexible element such as a chain 45 with the cross bar 19 connecting the standards 17. The rock shaft 43 is also provided with a radial arm 46 which is connected by a link 47 with a hand lever 48 fulcrumed upon the auxiliary frame B, said lever being equipped with a stop member 49 engaging a rack segment 50 whereby the parts may be retained in adjusted position.

When the machine is to be used for the purpose of working out sorghum, cane or the like, the arms 39 are provided in place of the hoes or chopping blades 40 with teeth 51, substantially as shown in Fig. 8 of the drawings.

From the foregoing description, taken in connection with the drawings hereto annexed, the operation and advantages of this invention will be readily understood by those skilled in the art to which it appertains. It will be seen that as the machine advances over the ground, motion will be transmitted from the axle to the revolving shaft 34 carrying the hub 38 which is equipped with the chopping device. By mounting the hoe carrying arms on the beveled edge of the hub 38, the said arms at diametrically opposite sides of the hub will extend from said hub at an angle to each other. Thus, when one of said arms is in an approximately horizontal position with the hoe blade in active engagement with the ground, the diametrically opposite arm will extend in an upward direction, the opposite arms being at an angle of approximately 90 degrees, more or less, according to the bevel of the hub. The relative position of the blade carrying arms will be best understood by reference to Fig. 3. By manipulating the lever 48 the auxiliary frame may be adjusted to lift the operative parts of the machine from the ground for the purpose of clearing stumps and other obstructions and for the purpose of enabling the machine to be transported from place to place. By operating the shipping lever 11, the machine may be thrown into and out of gear, as may be desired. By manipulating the lever 28 it will be seen that the earth engaging gage members or runner blades may be raised or depressed, as may be desired. It will be evident that by proper adjustment of said gage members, the depth of operation of the plows and the chopping device may be accurately gaged and regulated according to existing conditions so as to avoid any possibility of the growing plants being injured or mutilated by the machine when in operation.

Having thus described the invention, what is claimed as new, is:—

1. In a cotton chopper, a main transporting frame, a pivotally supported adjustable auxiliary frame, an inclined shaft supported for rotation upon the auxiliary frame, a chopping wheel carried by said shaft, plow carrying standards associated with the auxiliary frame, earth engaging gage members pivotally associated with the plows, and means for tilting the gage members to various angles to regulate the depth of operation of the chopping device.

2. In a cotton chopper, a transporting frame, a longitudinal inclined driven shaft, a chopping device carried by said shaft and operating transversely of the row, said chopping device including individual chopping blades mounted to engage the row diagonally, scraping plows supported to operate in advance of the chopping device, earth engaging gage members movably associated with the scraping plows, and means for tilting the gage members to regulate the depth of operation of the chopping device.

In testimony whereof I affix my signature in presence of two witnesses.

JAMES W. EARNEST.

Witnesses:
BESSIE MCCALLUM,
J. L. MCCALLUM.

Copies of this patent may be obtained for five cents each, by addressing the "Commissioner of Patents, Washington, D. C."